United States Patent
Waldschmidt et al.

(10) Patent No.: US 8,230,700 B2
(45) Date of Patent: *Jul. 31, 2012

(54) METHOD OF MAKING A COATED THREE-DIMENSIONALLY SHAPED GLASS CERAMIC BODY, ESPECIALLY A FIREPLACE OR OVEN VIEWING WINDOW PANE

(75) Inventors: Holger Waldschmidt, Nieder-Wiesen (DE); Tino Krieg, Mainz (DE); Marten Walther, Alfeld (DE)

(73) Assignee: Schott AG, Mainz (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/041,508

(22) Filed: Mar. 7, 2011

(65) Prior Publication Data

US 2011/0154857 A1 Jun. 30, 2011

Related U.S. Application Data

(63) Continuation of application No. 12/036,465, filed on Feb. 25, 2008, now Pat. No. 7,958,745.

(30) Foreign Application Priority Data

Feb. 5, 2007 (DE) .......................... 10 2007 006 421
Aug. 2, 2007 (DE) .......................... 10 2007 036 407

(51) Int. Cl.
*C03C 17/23* (2006.01)
(52) U.S. Cl. ............................. 65/60.2; 65/60.1; 65/17.2
(58) Field of Classification Search ................... 65/17.2, 65/60.1, 60.2
See application file for complete search history.

(56) References Cited

U.S. PATENT DOCUMENTS

| | | | | |
|---|---|---|---|---|
| 3,681,043 A * | 8/1972 | Bognar | ............... | 65/33.2 |
| 4,277,522 A * | 7/1981 | Dorfeld | ............... | 427/292 |
| 5,931,152 A * | 8/1999 | Fafet et al. | ............... | 126/214 R |
| 2006/0024509 A1* | 2/2006 | Vilato et al. | ............... | 428/426 |
| 2008/0187692 A1* | 8/2008 | Roquiny et al. | ............... | 428/34 |

* cited by examiner

*Primary Examiner* — Queenie Dehghan
(74) *Attorney, Agent, or Firm* — Michael J. Striker

(57) ABSTRACT

The method produces a coated three-dimensionally shaped glass ceramic body, especially a viewing window pane, which is provided with a reflective, anti-reflective or partially reflective layer. The method includes coating a flat green glass body to produce a coated green glass body and subsequently shaping the coated green glass body and ceramizing to form the coated three-dimensionally shaped glass ceramic body. In preferred embodiments the shaping the ceramizing occur at the same time. The reflective or anti-reflective coating is preferably applied to the green-glass body by an economical sol-gel process.

7 Claims, No Drawings

METHOD OF MAKING A COATED THREE-DIMENSIONALLY SHAPED GLASS CERAMIC BODY, ESPECIALLY A FIREPLACE OR OVEN VIEWING WINDOW PANE

CROSS-REFERENCE

This is a continuation under 35 U.S.C. §120 of Ser. No. 12/036,465, filed Feb. 25, 2008 now U.S. Pat. No. 7,958,745, which is entitled to the benefit of priority of invention under 35 U.S.C. §119 (a) to (d) based on German Patent Application DE 10 2007 010 706.6, filed on Feb. 28, 2007 in Germany.

BACKGROUND OF THE INVENTION

1. The Field of the Invention

The subject matter of the present invention is a method of making a coated three-dimensionally shaped glass ceramic body and, especially a method of making a coated three-dimensionally shaped glass ceramic window pane for a fireplace or oven viewing window.

2. Related Art

Glass ceramic panels or plates are used, above all, as window panes and are generally made in one piece. Not only can they be flat, but also they can be three-dimensionally shaped, for example, angled, bulged, and also they can have a shape that is a mixture of different forms. Three-dimensionally shaped glass ceramic panels are made by bending or curving a green glass body and subsequently ceramizing it. It is sometimes even possible to simultaneously ceramize and shape the green glass body with simple shaping techniques. A glass ceramic body is made in a known way in which a green glass body, which has a composition suitable for conversion into a glass ceramic body, is subjected to a ceramizing process. The ceramizing process comprises first heating the glass at a temperature at which crystal nuclei form and subsequently at a higher temperature to perform the ceramizing with the help of the already formed crystal nuclei in the ceramizing step.

The resulting glass ceramic is especially resistant to heating and temperature changes, which makes it especially suitable for many applications, especially viewing window panes.

Glass ceramic plates or panels are used in the lighting industry as window panes for powerful light sources, window panes in space heaters, oven door or baking oven window panes, cook tops for stoves and in many other applications, in which good mechanical strength and temperature change resistance are required.

Currently glass ceramic panels are increasingly used as window panes in fireplace applications, in which the spreading of sparks and glowing embers into the living area is prevented by means of a transparent window pane. The window pane allows observation of the flames. Also a viewing window pane is frequently built into a fireplace oven in order to permit observation of the fire and/or the embers. It is possible to build the viewing window pane into a door frame, e.g. a metal door frame, or to use the viewing window pane directly as a door or window for closure of the space in which the fire is contained.

In many cases for aesthetic reasons the glass ceramic window pane is provided with a reflective coating after it has been made, so that one can of course see the flames and/or the light when the light source, the fireplace or the oven is operated, but not the space behind the window pane, i.e. the unattractive interior structure of the oven or fireplace, which remains dark, when the light source is turned off or the fire is put out, as described for example in US Published Patent Application 2006/0024509 A1.

The glass ceramic is coated according to the usual methods, especially by pyrolysis of powder, liquid or gas, by vapor deposition or by sputtering, particularly by plasma-assisted deposition methods and reactive sputtering of a suitable metal in the presence of oxygen and/or nitrogen and the like.

The coating that is applied can be a single-layer coating, e.g. ITO for reflection of IR radiation, or a multi-layer coating, e.g. an interference layer system of several high and low refractive index layers, which each have a layer thickness in the vicinity of about a quarter of the average wavelength of light, so that the observed color of the coated glass ceramic is from a blue-silver to golden depending on the structure and layer thickness. The layer system should be scratch-resistant, so that it can be cleaned without damaging it. Soft layers are preferably protected from scratches with hard covering layers.

While the coating of a flat glass ceramic window pane is relatively easy and can be performed with a conventional coating apparatus for flat glass, the coating of a three-dimensionally shaped glass ceramic window pane is substantially more difficult, since the geometry of the coating apparatus must be adjusted for each shape to provide a uniform coating.

SUMMARY OF THE INVENTION

It is an object of the present invention to provide a simple method of making a coated three-dimensionally shaped glass ceramic panel or body, which can be performed with existing coating apparatus without adjustment of the known coating apparatus to the particular shape of the three-dimensionally shaped glass ceramic panel or body.

According to the invention the method of making the coated three-dimensionally shaped glass ceramic panel or body comprises the steps of:

a) coating a flat green glass body that is suitable for forming a glass ceramic so as to form a coated flat green glass body; and then b) shaping and ceramizing the coated flat green glass body to form the coated three-dimensionally shaped glass ceramic panel or body.

It was surprisingly discovered that a coated flat green glass suitable for making a glass ceramic could be shaped and ceramicized to form a coated three-dimensionally shaped glass ceramic body, without damaging the coating or causing a loss of its function.

The glass ceramic material used as for fireplace or oven viewing window applications typically has a linear thermal expansion coefficient of from $-2 \cdot 10^{-6} K^{-1}$ to $+2 \cdot 10^{-6} K^{-1}$. It is known and obtained from numerous manufacturers in a great many forms. Generally it is a glass ceramic material of the $Li_2O/Al_2O_3/SiO_2$ system with a composition in wt. % of, for example: 55-80, $SiO_2$; 12-27, $Al_2O_3$; 3-8, $Li_2O$; and 3-9, nuclei formers, such as $TiO_2$, $ZrO_2$, and, if necessary, even oxides of other alkali metals, alkaline earth metals, zinc, phosphorus, boron and the like.

After the coating, the green glass body is shaped and ceramized. This shaping can occur at the same time as the ceramizing. This latter embodiment of the method is possible when the glass ceramic body to be produced should be shaped only to a comparatively small degree and with a soft transition. The green glass body is placed in a negative mold and sinks in the mold during the ceramizing. Sharp-edged three-dimensionally shaped bodies generally may not be made by this thermal sinking technique, since the crystallization has already begun so that the glass body is more rigid and thus more difficult to shape during the ceramizing.

In an alternative embodiment of the method for glass ceramic bodies with sharp edges the coated green glass body is softened and then shaped or bent by forces acting on it. Subsequently the shaped and/or bent coated green glass body is ceramized in order to make the sharp-edged three-dimensionally shaped coated glass ceramic body.

The coating can be applied according to all known methods, e.g. by sputtering, evaporation, CVD (Chemical Vapor Deposition), plasma-assisted CVD, or according to sol-gel methods. The sol-gel methods are particularly preferred.

The coating is generally made in a known way and comprises an interference layer system of metal oxide layers, in which layers with high and low indices of refraction alternate. Especially $TiO_2$ and $SiO_2$ layers are frequently used, however nitride and oxinitride layers also find application. Generally a layer packet of three layers suffices for a sufficient effect. A plurality of up to 12 layers can be applied to produce special effects. Of course many other compounds can be used as layer materials. For example suitable high index of refraction materials include $ZnO$, $ZrO_2$, $SnO_2$, $Nb_2O_5$, $Si_3N_4$, mixed crystals, in which the individual ingredients are present in different amounts, such as $Sn_xZn_yO_z$, $Si_xTi_yO_z$. Suitable low index of refraction materials aside from $SiO_2$ include silicon oxide nitride and/or oxicarbide, mixed silicon-aluminum oxide and the like. These layer materials are indeed known for this purpose. The layer packets are produced, which reflect light or reduce reflections or selectively reflect or block reflection of certain wavelengths according to their structure and layer thickness, which is generally between $\lambda/4$ and $\lambda/2$ ($\lambda$=average wavelength of light). Especially an ITO layer for reflection of IR radiation can be used additionally or by itself.

To produce the desired effect with reflective layers no total reflection may occur, since otherwise the flames behind the window pane would not be visible. The layers are thus produce so that they are partially reflecting, as in the case of e.g. a partially transparent mirror or window pane (a so-called spy mirror or window mirror in a store).

The window can be provided with a base color or color shade besides its coating, which is achieved in a known way by addition of colored oxides during the preparation of the green glass. Currently widely used base colors include amber to brown and gray in different intensities.

In preferred embodiments of the method the coating is provided by means of a sol-gel process. This coating process is especially suitable for making interference layer systems, which comprise multiple layers, because of its low cost. The sol-gel process has been known for a decade and is used to a great extent. In the sol-gel process the glass bodies are dipped in solutions or sprayed with the solutions, which contain hydrolysable compounds of elements, which form oxide layers that have a high index of refraction, and hydrolysable compounds of elements, which form oxide layers that have a low index of refraction. The thickness of the layers formed in the dipping process depends on the speed, with which the glass bodies are drawn from the solutions. After each dipping or immersion event the layer formed is dried at temperatures of up to 120° C., after which the next dipping event occurs. When the required number of layers is produced, the coated green glass body is then shaped and ceramized. The last hydroxyl groups remaining in the coating are removed and organic residues are driven off at a temperature of about 250° C., the layers are burned in so that the layer packet is compacted under formation of oxide layers.

It is surprising that no cracks occur in the coating during ceramizing, which is based on the fact that the green glass body shrinks during the course of the ceramizing process to form the glass ceramic.

The same goes also for the layer packet made by the above-described method, which likewise undergoes shrinkage during the ceramizing.

An extraordinarily large number of metal oxide layers may be made according to the sol-gel process. Thus e.g. layers made from oxides of the following metals or their mixtures may be produced: Mg, Ca, Ba, Sr, Al, Ga, In, Si, Ge, Sn, Be, Te, Ir, Hf, No, Cr, Ta, Mo, W, Mn, Fe, Ru, Co, Rh, Ni, Pd, Zn, Cd, La, and the rare earths. Generally however $TiO_2$-layers and $SiO_2$-layers are preferred for making mirror layers or anti-reflection layers.

For example, one solution that is suitable for making a $TiO_2$-layer with a high index of refraction comprises an alcoholic solution of tetraethoxy-titanium, which is stabilized with acetyl acetone and contains 15 to 30 g/l of $TiO_2$. The process for making the coated glass substrate utilizing this solution comprises carefully dipping the glass substrate or green glass body in the solution and withdrawing it with a speed of 0.3 to 0.5 cm·s$^{-1}$. The glass substrate or green glass body is then dried and the sol-gel layer is fixed by gentle heating. After that the glass substrate can be dipped in a similar tetraethoxy-silane solution.

After the coating is fixed on it the glass body is resistant to scratches so that it can be handled. That is a great advantage because it is then possible that large glass bodies can be coated, which are next divided into pieces of the required size, i.e. for the desired end product, prior to the ceramizing step. This possibility and the fact that the burning-in of the coating requires no separate energy input, since the required energy must be provided for the ceramizing step, makes the sol-gel process especially economical.

While the invention has been illustrated and described as embodied in a method of making a coated three-dimensionally shaped glass ceramic body, especially a glass ceramic window pane for a fireplace or oven viewing window, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method of making a coated three-dimensional glass ceramic body, said method comprising the steps of:
   a) coating a flat green glass body that is suitable for forming a glass ceramic so as to form a coated flat green glass body; and
   b) after the coating of step a), shaping and ceramizing the coated flat green glass body to form the coated three-dimensional glass ceramic body, wherein the green glass body shrinks during the ceramizing;
   wherein the flat green glass body is provided with an interference layer system by said coating, and
   wherein said interference layer system is produced by a sol-gel process.

2. The method as defined in claim 1, wherein the coated flat green glass body is first shaped and then ceramized in a subsequent step.

3. The method as defined in claim 1, wherein the coated flat green glass body is shaped and ceramized at the same time.

4. The method as defined in claim 1, wherein the flat green glass body is provided with a reflective layer, an antireflective layer, or a partially reflective layer by said coating.

5. The method as defined in claim 1, wherein the interference layer system comprises alternating layers of high and low index of refraction, said alternating layers comprising inorganic compounds.

6. The method as defined in claim 5, wherein said inorganic compounds comprise oxides of silicon and titanium.

7. The method as defined in claim 1, wherein the coated three-dimensional glass ceramic body is angled, bulged, curved, or bent.

* * * * *